United States Patent [19]

Schwab et al.

[11] Patent Number: 5,207,829

[45] Date of Patent: May 4, 1993

[54] PIGMENT PREPARATIONS

[75] Inventors: Wolfgang Schwab, Kelsterbach; Erwin Dietz, Kelkheim, both of Fed. Rep. of Germany

[73] Assignee: Hoechst Aktiengesellschaft, Frankfurt am Main, Fed. Rep. of Germany

[21] Appl. No.: 803,346

[22] Filed: Dec. 4, 1991

[30] Foreign Application Priority Data

Dec. 6, 1990 [DE] Fed. Rep. of Germany ....... 4038885

[51] Int. Cl.$^5$ .................... C08K 5/357; C08K 5/3437
[52] U.S. Cl. .................... 106/493; 106/20 R; 106/23 H; 106/402; 106/408; 106/410; 106/411; 106/412; 106/413; 106/414; 106/495; 106/496; 106/497; 106/498
[58] Field of Search .................. 106/20, 23, 402, 408, 106/410, 411, 412, 413, 414, 493, 495, 496, 497, 498

[56] References Cited

U.S. PATENT DOCUMENTS

| | | | |
|---|---|---|---|
| 3,073,843 | 1/1963 | Buc | 548/551 |
| 3,920,469 | 11/1975 | Kienzle et al. | 106/411 |
| 3,973,981 | 8/1976 | Miyatake et al. | 106/411 |
| 4,253,839 | 3/1981 | Spietschka et al. | 8/565 |
| 4,310,359 | 1/1982 | Ehashi et al. | 106/494 |
| 4,317,682 | 3/1982 | Katsura et al. | 106/402 |
| 4,664,714 | 5/1987 | Katsura et al. | 106/411 |
| 4,769,454 | 9/1988 | Blank et al. | 540/531 |

FOREIGN PATENT DOCUMENTS

| | | |
|---|---|---|
| 1260433 | 8/1968 | Fed. Rep. of Germany . |
| 2500509 | 2/1976 | Fed. Rep. of Germany . |
| 2316388 | 4/1982 | Fed. Rep. of Germany . |
| 2742575 | 5/1982 | Fed. Rep. of Germany . |
| 3514077 | 10/1986 | Fed. Rep. of Germany . |
| 3700451 | 7/1988 | Fed. Rep. of Germany . |
| 3106906 | 5/1990 | Fed. Rep. of Germany . |
| 3031301 | 7/1990 | Fed. Rep. of Germany . |

*Primary Examiner*—Mark L. Bell
*Assistant Examiner*—Scott L. Hertzog

[57] ABSTRACT

Pigment preparations whose pigment portion is composed essentially of organic pigments and of pigment additives of the formula I

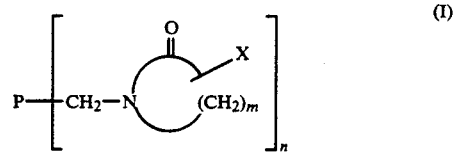

in which P is a radical of an organic pigment and X in the methylene groups of the lactam ring is hydrogen, $C_1$–$C_4$-alkyl, phenyl, hydroxyl, $NR^1R^2$ or COOM, m is an integer from 3 to 20 and n can have a value from 0.1 to 4, are suitable for pigmenting high-molecular-weight organic materials in solvent-borne as well as aqueous systems.

The pigment preparations have high flocculation stability and good rheological properties.

12 Claims, No Drawings

PIGMENT PREPARATIONS

The present invention relates to novel pigment additives and pigment preparations whose pigment portion is composed of organic pigments and pigment additives, as well as to the use of these pigment preparations.

Numerous problems can arise in the dispersion of pigments in high-molecular-weight materials. With pigments which agglomerate strongly and are difficult to disperse, dispersion remains incomplete and optimum fineness and tinctorial strength are not reached. Incompletely dispersed agglomerates and large particles can interfere with further processing; in particular in low-viscosity systems, for example in paints and painting inks, they can lead to sedimentation problems. Furthermore, flocculation during dispersion, storage or further processing can result in undesirable rheological changes in the system and in surface defects and loss of tinctorial strength and gloss of an applied film.

It is known that the flocculation characteristics of pigments can in certain cases be favorably influenced by additives containing basic groups. In general, these additives are basically substituted derivatives of pigments.

It is stated in German Patent 1,260,433 and U.S. Pat. No 3,920,469 as well as in U.S. Pat. Nos. 3,973,981, 4,310,359 and 4,664,714 that basic pigment derivatives of the formula 1 (see list of formulae) impede flocculation of the pigments, P being a pigment radical, X being a bridging group, for example —CO— or —$SO_2$—, $R^1$, $R^2$ and $R^3$ in each case being hydrogen or an alkyl group, m being an integer from 1 to 6 and n having a value from 1 to 4.

However, the synthesis of these compounds is very costly and associated with a high degree of ecological contamination, since the introduction of the substituents requires large amounts of sulfuric acid or chlorosulfonic acid.

U.S. Pat. No. 4,317,682 discloses basic pigment additives which are colorless compounds of the general formula 2 (see list of formulae), in which Q is an aromatic polycyclic compound radical, A is a chemical bond, —$CONHC_6H_4$— or —$SO_2NHC_6H_4$—, $R^1$, $R^2$ and $R^3$ have the meanings defined above, m is an integer from 1 to 6 and n has a value from 1 to 3. Here, too, significant ecological problems are encountered in the preparation of compounds of this type. In addition, these pigment derivatives enhance the flocculation characteristics of many pigments only slightly. A drawback of these pigment derivatives is that they act only in conventional, solvent-borne binder systems, whereas in aqueous paint systems they tend to cause impairment of the application properties.

The object of the present invention is to make available novel pigment preparations having high flocculation stability and good rheological properties, which are suitable for both aqueous and organic solvent-borne binder systems.

This object is achieved by pigment preparations whose pigment portion is composed essentially of organic pigments selected from the class of azo pigments, anthraquinone, anthanthrone, flavanthrone, quinacridone, quinophthalone, dioxazine, isoindoline, isoindolinone, perinone, perylene and/or thioindigo pigments, and of pigment additives of the formula I (see list of formulae and claim 1), in which P is a radical of an organic pigment from the above classes, m is an integer from. 3 to 20, n can have a value from 0.1 to 4, and X in the methylene groups of the lactam ring is hydrogen, $C_1$-$C_4$-alkyl, phenyl, hydroxyl, $NR^1R^2$ where $R^1$ and $R^2$ independently of one another are hydrogen or $C_1$-$C_4$-alkyl, or COOM where M is hydrogen or the stoichiometric amount of a mono-, di- or trivalent cation. $C_1$-$C_4$-alkyl can be methyl, ethyl, n-propyl, isopropyl, n-butyl, sec.-butyl, isobutyl or tert.-butyl.

The optimum value for the number n depends on the chemical constitution, on the crystal and surface properties of the pigment and on the properties of the application medium, and must be determined experimentally in the particular case for each pigment/application medium combination. The pigment additive is normally a mixture of compounds of the formula I, in which n parts of the lactam radical are linked on average to one part of the pigment radical P. For this reason, n can also be a fraction.

Preferred pigment preparations are those which are composed of organic pigments and pigment additives of the formula (I), in which P is the radical of a polycyclic pigment selected from the class consisting of anthraquinone anthanthrone, quinacridone, quinophthalone, dioxazine, isoindoline, isoindolinone, perinone, perylene and/or thioindigo, and of these particularly preferred are those in which X is hydrogen or $NR^1R^2$, $R^1$ and $R^2$ independently of one another being hydrogen or $C_1$-$C_4$-alkyl, m being preferably an integer from 3 to 6 and n having preferably a value from 1 to 3. Of these, the pigment preparations which are particularly preferred are those in which X is hydrogen, m is an integer from 3 to 5 and n has a value from 1.5 to 3. Particularly preferred are also those pigment preparations whose pigment portion is composed of quinacridone and dioxazine pigments.

Compared with known pigment preparations, the pigment preparations according to the invention have the advantage of possessing high flocculation stability not only in solvent-borne systems, but also in aqueous binders, the consequences of which are very good rheological properties during processing and outstanding gloss characteristics after application. Moreover, the pigment preparations according to the invention have good application properties in powder coatings.

The pigment additives forming the basis of the invention are novel and form likewise the subject of the invention.

The pigment additives of the formula (I) according to the invention can be prepared by conventional methods either from N-hydroxymethyllactams of the formula (II) (see list of formulae), obtainable according to U.S. Pat. No. 4,769,454 or U.S. Pat. No. 3,073,843, or from lactams of the formula (III) (see list of formulae) in the presence of substances releasing formaldehyde, for example paraformaldehyde or trioxane, in an acid reaction medium, for example sulfuric acid, oleum or polyphosphoric acid, and the above pigments, it being advantageous to choose an acid in which the pigment in question is soluble. By the use of concentrated sulfuric acid or oleum as condensation medium, it is possible to a small extent to incorporate sulfonic acid groups into the pigment derivative.

The pigments contained in the pigment preparations according to the invention can be present as pure pigments, as mixtures of at least two pigments or as mixed crystals from at least two pigments. The amount of pigment additives of the formula (I) which is added to the pigments to prepare the preparations according to the invention can fluctuate within wide limits. Care must only be taken that the target pigment quality is not impaired. The pigment preparations can be either a single pigment or mixtures of pigments, in each case with one or more pigment additives of the formula I. The amount of the pigment additive of the formula I according to the invention required will depend on the surface of the pigment in question. Preferred pigment preparations are composed of a) 99.5 to 75, preferably 95 to 85, parts by weight of at least one organic pigment, b) 0.5 to 25, preferably 5 to 15, parts by weight of at least one pigment additive of the formula (I) and c) 0 to 10, preferably 0 to 5, parts by weight of other conventional additives such as surfactants, resins, rheological additives, preservatives and/or antidust agents.

The pigment preparations can be prepared in various ways. Thus, for example, the pigment additives can be added to the water-moist pigment filter cake prior to drying, and incorporated therein. It is also possible to prepare dry mixtures of ground pigment additives with the pigment powder. However, in many cases optimum results are not achieved in this way. It has been found satisfactory to add the pigment additives as early as during the preparation of the pigments or in the course of a comminution process or solvent finishing. The addition of the pigment additives can also take place in the course of wet grinding a pigment in an aqueous, aqueous-organic or organic medium, for example in a bead mill. The addition of the pigment additives before or after pressure finishing in an aqueous, aqueous-organic or organic medium has also been found satisfactory. The isolation of the mixtures from this medium is preferably carried out in a neutral or alkaline pH range.

The pigment preparations according to the invention are particularly suitable for the pigmentation of high-molecular-weight organic materials. It is a particular advantage that they possess high flocculation stability both in solvent-borne and aqueous binders, outstanding rheological properties and at the same time good gloss development. The pigment preparations according to the invention are particularly suitable for the pigmentation of automotive finishes.

Examples of high-molecular-weight organic materials which can be pigmented with these preparations are cellulose ethers and cellulose esters, in particular ethylcellulose, nitrocellulose, cellulose acetate and cellulose butyrate, natural resins or synthetic resins, for example polymerization or condensation resins, for example aminoplastics, in particular urea- and melamine-formaldehyde resins, alkyd resins, acrylic resins, phenolics, polycarbonates and polyolefins, in particular polystyrene, polyvinyl chloride, polyethylene, polypropylene, polyacrylonitrile, polyamides, polyurethanes or polyesters, acrylourethanes or polyesterurethanes either singly or in mixtures.

The above high-molecular-weight organic substances can be present as plastic masses, melts or in the form of paints, coatings or printing inks.

Baking paints selected from the class of alkyd melamine resin paints or acrylic melamine resin paints as well as aqueous polyester, polyacrylate and polyurethane paints are preferred.

The pigment preparations according to the invention are readily, and to a high degree of fineness, dispersible in these application media. These dispersions possess high flocculation stability and have outstanding rheological properties. Using these, it is possible to produce finishes having high tinctorial strength, high gloss and high translucence with outstanding fastness properties. To assess the properties of the claimed pigment preparations in paint systems, an alkydmelamine resin paint (AM) based on a) a medium-oil, non-drying alkyd resin (based on synthetic fatty acids and phthalic anhydride) and b) a melamine resin etherified with butanol, containing c) a proportion of a non-drying alkyd resin based on dehydrated ricinoleic acid (short-oil), as well as a paint based on an aqueous polyurethane dispersion (PUR) were chosen from the large number of known systems. In the following examples, the two paints will be referred to as 'AM' and 'PUR' respectively.

The rheology of the grinding stock after dispersion (millbase rheology) is evaluated according to the following scale of five ratings:

5 thin liquid
4 liquid
3 thick liquid
2 somewhat sluggish
1 sluggish.

Viscosity can be assessed with the aid of Viskospatel according to Rossman, type 301 from Erichsen, Iserlohn, after the grinding stock has been diluted to the final concentration of the pigment. Prior to applying the paint, the desired viscosity was adjusted in such a way that it corresponded to a given efflux time, in seconds (s), from a Ford cup (nozzle diameter 4 mm).

Gloss measurements were performed at an angle of 20° according to DIN 67 530 (ASTMD 523) using a 'multi-gloss' glossmeter from Byk-Mallinckrodt, Wesel.

In the following examples the parts and percentages are by weight. The number n of the lactam radicals bonded to the pigment radical was in each case determined by the ratio of the integral of the protons in the lactam ring to that of the protons in the pigment radical in a $^1$H-NMR spectrum.

In the tables, 'FS 3% P' signifies in each case full shade 3% pigment, and '1 10 TiO$_2$' signifies '1 part of pigment to 10 parts of titanium dioxide white pigment'. 'demin. water' signifies 'demineralized water'.

EXAMPLES 1) 28.0 parts of 2,5-diphenylaminoterephthalic acid were introduced into 560 parts of polyphosphoric acid (84% P$_2$O$_5$) at 110° C. and the mixture was stirred for 30 minutes. 34.4 parts of N-hydroxymethylcaprolactam were then added in portions over 15 minutes and stirring was continued for 3 hours at 110°-115° C. The mixture was then added to 1200 parts of ice water, thereby hydrolyzed, and the product was filtered off with suction and washed until neutral. 188.7 parts of the pigment additive of the formula (IV) (see list of formulae) were obtained as a 22.8% moist filter cake.

179.0 parts of a moist crude quinacridone (24.5%), obtained by the ring closure of 2,5-di(4-methylphenylamino)terephthalic acid in polyphosphoric acid, hydrolysis using ice water and filtration, were suspended in 270 parts of isobutanol, 2.5 parts of sodium hydroxide were added and the preparation was completed by heating the mixture for 3 hours in an autoclave at a temperature of 125° C. and a pressure of about 3 bar. The isobutanol was subsequently removed by steam distillation. After cooling the reaction mixture to 50° C., 10.1 parts of the 22.8% moist filter cake of the pigment additive of the formula (IV) described above were added and the mixture was stirred for 2 hours. The product was isolated by filtration, washed until neutral and dried at 80° C., yielding 45.0 parts of a preparation of C.I. Pigment Red 122.

A commercial AM paint was pigmented with the pigment preparation described above to a pigment content of 12%. After the mixture was dispersed for 45 minutes using glass beads 3 mm in diameter, its rheology was rated as 5, while a grinding stock prepared in a similar manner using the untreated pigment had a rheology rating of 1. The full-shade paint pigmented to 4% after dilution ('paint-out') with further AM paint had a viscosity of 3.4 s compared with 4.5 s obtained with the untreated pigment. By adding a mixture of n-butanol/xylene (1:1), the viscosity of the full-shade paint was adjusted to an efflux time from a Ford cup (nozzle diameter 4 mm) of 22 s. The paint was then poured onto a foil, flashed off and baked for 30 minutes at 140° C. The gloss was 86 compared with 58 for the paint prepared using the untreated pigment.

2) 14.0 parts of 2,5-diphenylaminoterephthalic acid were introduced into 280 parts of polyphosphoric acid (84% $P_2O_5$) at 110° C. and the mixture was stirred for 1 hour. 12.4 parts of N-hydroxymethylvalerolactam were then added in portions over 20 minutes. Stirring was continued for 3.5 hours at 110° C. and hydrolysis was then effected by adding the mixture to 600 parts of ice water. The product was filtered off with suction and washed until neutral, yielding 106 parts of a compound of the formula (V) (see list of formulae) as a 19.0% moist filter cake.

179.0 parts of a moist crude quinacridone (26.4%), obtained by the ring closure of 2,5-di(4-methyl-phenylamino)terephthalic acid in polyphosphoric acid, hydrolysis using ice water and filtration, were suspended overnight in 270 parts of isobutanol, 50 parts of demineralized water and 2.5 parts of sodium hydroxide. 23.2 parts of the 19.0% moist filter cake of the pigment additive of the formula (V) were added and the mixture was stirred in an autoclave for 3 hours at 125° C. The isobutanol was subsequently removed by steam distillation. The distillation residue was filtered off, washed until neutral and dried at 80° C., yielding 43.4 parts of a preparation of C.I. Pigment Red 122.

a) In the test described in Example 1, the pigment preparation produced with the AM paint finishes which are more translucent and of a greater tinctorial strength than those obtained using the untreated pigment.

|  | Example 2 | Comparison |
|---|---|---|
| Rheology | 5 | 1–2 |
| Gloss | 95 | 47 | b) 90 parts of glass beads (diameter 1 mm) were added to 12.0 parts of the pigment preparation of C.I. Pigment Red 122, 47.5 parts of a 25% aqueous polyurethane resin and 0.5 parts of a commercial antifoam and the mixture was dispersed for 60 minutes in a laboratory bead mill at 40° C. A 20% pigment paste as obtained which was diluted with further aqueous PUR resin to a pigment concentration of 3%. A substantially more translucent coating having greater tinctorial strength, higher gloss and the same rheology was obtained compared with the coating obtained using an untreated pigment.

|  | Rheology | FS 3% P | 1:10 $TiO_2$ | Gloss |
|---|---|---|---|---|
| Comparison | 3–4 | — | — | 64 |
| Example 2 | 3 | substantially more translucent | of distinctly greater tinting strength | 79 |

This pigment has color properties superior even to a pigment coated with a basic pigment derivative, such as that of U.S. Pat. No. 4,310,359, Example 1.

|  | FS 3% P | 1:10 $TiO_2$ | Gloss |
|---|---|---|---|
| Pigment with additive according to U.S. Pat. No. 4,310,359 |  |  |  |
| Example 1 | — | — | 6 |
| Example 2 | somewhat more translucent | of distinctly greater tinting strength | 79 |

3) 18.4 parts of a 19.6% moist filter cake of the pigment derivative from Example 1 were added to 500 parts of a 7.3% aqueous isobutanolic suspension of crude C.I. Pigment Violet 19 and the preparation was completed by heating the mixture for five hours in an autoclave at 145° C. and a pressure of 3 to 6 bar. The isobutanol was subsequently removed by steam distillation. The reaction mixture was stirred for 30 minutes, its pH was adjusted to 8–9 with 10% sodium hydroxide and the pigment preparation was then isolated by filtration, washed until neutral and dried at 80° C., yielding 38.9 parts of a pigment preparation of C.I. Pigment Violet 19.

A test of the AM paint with a 5% pigmentation furnished a coating that was substantially more translucent and of substantially greater tinctorial strength in brightening the white than that obtained using an untreated comparison.

|  | Rheology | FS 5% P | 1:10 $TiO_2$ | Gloss |
|---|---|---|---|---|
| Comparison | 4–5 | — | — | 53 |
| Example 3 | 5 | substantially more translucent | of distinctly greater tinting strength | 80 |

4) 14.0 parts of 2,5-diphenylaminoterephthalic acid were introduced into 280 parts of polyphosphoric acid (84% $P_2O_5$) at 105° C. and the mixture was stirred for 1 hour at 105° C. 13.9 parts of N-hydroxymethylpyrrolidone were then added in portions over 15 minutes. Stirring was continued for 3 hours at 110° C. and hydrolysis was then effected by adding the mixture to 600 parts of ice water. The product was filtered off with suction, washed until neutral and dried at 80° C., yielding 21.3 parts of a compound of the formula (VI) (see list of formulae).

20.0 parts of dry 2,9-dimethylquinacridone (C.I. Pigment Red 122) and 1.0 part of the pigment additive of the formula (VI) were ground together in a laboratory mill to a homogeneous mix. In the test described in Example 1, this pigment preparation produced with the AM paint better rheological and color properties than those obtained using the untreated comparison pigment.

|  | Example 4 | Comparison |
|---|---|---|
| Rheology | 5 | 1-2 |
| Viscosity | 2.9 s | 4.6 s |
| Gloss | 79 | 59 |

5) 18.0 parts of C.I. Pigment Violet 23 were introduced in portions into 360 parts of polyphosphoric acid (84% $P_2O_5$) at 80° C. and the mixture was stirred for 15 minutes. 10.4 parts of N-hydroxymethylpyrrolidone were then slowly added. Stirring was continued for 3.5 hours at 105°-110° C., hydrolysis was effected by adding the mixture to 700 parts of ice water and its pH was adjusted to 9-10 with concentrated sodium hydroxide solution. The reaction mixture was allowed to stand overnight, the precipitate was then filtered off and washed with water until neutral and salt-free. 139.9 parts of a 16.3% moist filter cake of a compound of the formula (VII) (see list of formulae) were obtained.

75.0 parts of a 40% moist filter cake of crude C.I. Pigment Violet 23 (salt-free) were mixed to a paste with a mixture of 96.0 parts of isobutanol, 196.0 parts of dem. water and 2.7 parts of concentrated formic acid over 15 minutes. The reaction mixture was then refluxed for 1 hour, 18.4 parts of the 16.3% moist filter cake of the compound of the formula (VII) were added, the mixture was stirred for 30 minutes and the isobutanol was removed by steam distillation. The pigment preparation was isolated by filtration, washed until neutral and dried at 80° C. 32.3 parts of a pigment preparation of C.I. Pigment Violet 23 were obtained.

A commercial AM paint was pigmented with the pigment preparation described above to a pigment content of 10%. After the mixture was dispersed for 45 minutes using glass beads 3 mm in diameter, its rheology was rated as 5, while a grinding stock prepared in a similar manner using a pigment prepared according to U.S. Pat. No. 4,253,839, Example 2, had a rheology rating of 1.

The full-shade paint pigmented to 3% had, after dilution with further AM paint, a viscosity of 3.3 s, compared with 10.2 s for the pigment. By adding a mixture of n-butanol/xylene (1:1), the viscosity of the full-shade paint was adjusted to an efflux time from a Ford cup (nozzle diameter 4 mm) of 22 s. The paint was poured onto a foil, flashed off for 20 minutes and baked at 140° C. The gloss value was 70 (comparison pigment 19).

6) 18.0 parts of crude C.I. Pigment Violet 23 (salt-free) were introduced into 350 parts of polyphosphoric acid (84% $P_2O_5$) at 80°-85° C. The mixture was stirred for 30 minutes and 8.8 parts of N-hydroxymethylcaprolactam were added over 20 minutes. Stirring was continued for 1.5 hours at 105° C. and the reaction mixture was then poured onto 700 parts of ice water, the product was filtered off and washed until neutral. 81.2 parts of a 25.7% moist filter cake of a pigment derivative of the formula (VIII) (see list of formulae) were obtained.

75.0 parts of a 40% moist filter cake of crude C.I. Pigment Violet 23 (salt-free) were stirred into a mixture of 96.0 parts of isobutanol, 170.0 parts of dem. water and 2.7 parts of concentrated formic acid over 15 minutes. 11.7 parts of the 25.7% moist filter cake of the formula (VIII) were then added, stirring was continued for 1 minute and the reaction mixture was refluxed for 1 hour. The isobutanol was then removed by steam distillation, the mixture was allowed to cool to 40° C. and its pH was adjusted to 8-9 with concentrated sodium hydroxide solution. The product was filtered off with suction, washed until neutral and dried at 80° C., yielding 31.8 parts of a pigment preparation of C.I. Pigment Violet 23. Compared with the pigment preparation obtained using the comparison pigment from U.S. Pat. No. 4,253,839, Example 2, the pigment preparation obtained had a substantially better rheology in the AM paint and lower viscosity.

|  | Example 6 | Comparison |
|---|---|---|
| Rheology | 5 | 1-2 |
| Viscosity | 3.3 s | 8.3 s | of Formulae

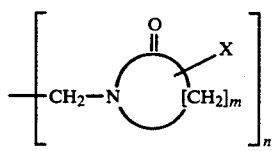

(I)

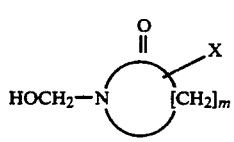

(II)

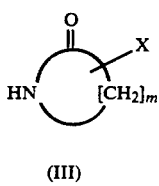

(III)

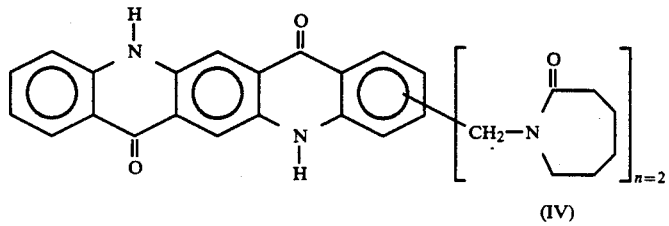

(IV)

-continued
of Formulae

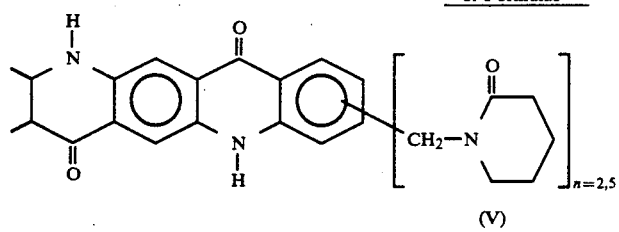

(V)

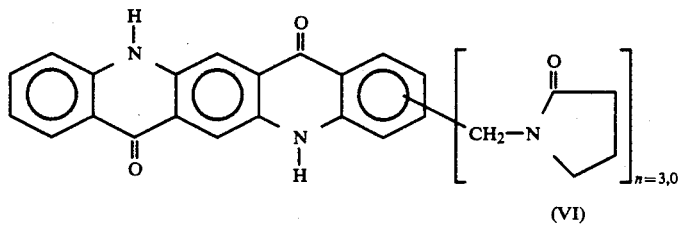

(VI)

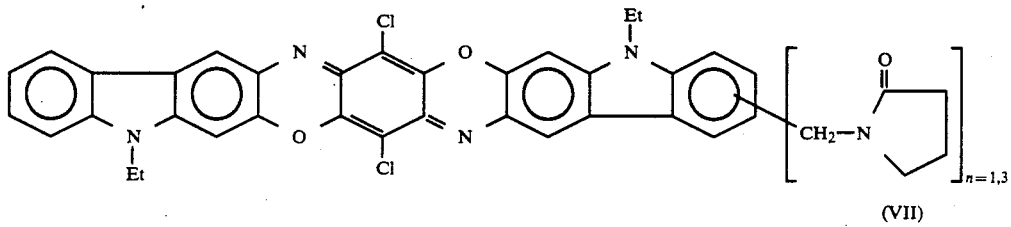

(VII)

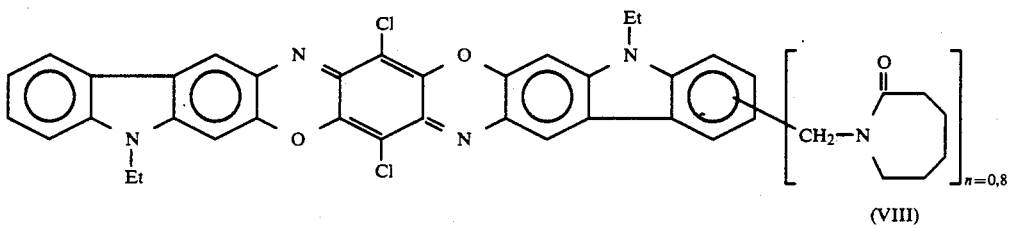

(VIII)

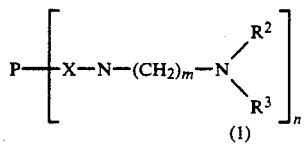

(1)

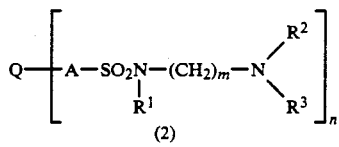

(2)

We claim:

1. A pigment preparation whose pigment portion is comprised of organic pigments selected from the class consisting of azo pigments anthraquinone anthanthrone, flavanthrone, quinacridone, quinophthalone, dioxazine, isoindoline, isoindolinone, perinone, perylene and/or thioindigo pigments, and of pigment additives of the formula (I),

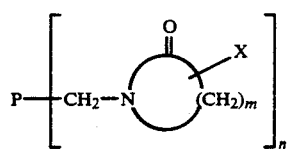

(I)

in which P is a radical of an organic pigment from the above classes, m is an integer from 3 to 20, n can have a value from 0.1 to 4, and X in the methylene groups of the lactam ring is hydrogen, $C_1$–$C_4$-alkyl, phenyl, hydroxyl, $NR^1R^2$, $R^1$ and $R^2$ independently of one another being hydrogen or $C_1$–$C_4$-alkyl, or COOM, M being hydrogen or the stoichiometric amount of a mono-, di- or trivalent cation.

2. A pigment preparation as claimed in claim 1, wherein P is a radical of a polycyclic pigment selected from the class consisting of anthraquinone, anthanthrone, quinacridone, quinophthalone, dioxazine, isoindoline, isoindolinone, perinone, perylene and/or thioindigo, X is hydrogen or $NR^1R^2$, $R^1$ and $R^2$ independently of one another being hydrogen or $C_1$–$C_4$-alkyl, m is an integer from 3 to 6 and n can have a value from 1 to 3.

3. A pigment preparation as claimed in claim 2, wherein X is hydrogen, m is an integer from 3 to 5 and n has a value from 1.5 to 3.

4. A pigment preparation as claimed in claim 1, wherein the pigments contained therein are quinacridone and/or dioxazine pigments.

5. A pigment preparation as claimed in claim 1, wherein the pigments contained therein are present as pure pigments or as mixed crystals from at least two pigments.

6. A pigment preparation as claimed in claim 1, wherein the pigment preparation is composed of a) 99.5 to 75 parts by weight of at least one organic pigment, b) 0.5 to 25 parts by weight of at least one pigment additive of the formula (I) and c) 0 to 10 parts by weight of other conventional additives.

7. A pigment preparation as claimed in claim 1 wherein the pigment preparation is composed of a) 95 to 85 parts by weight of at least one organic pigment;

b) 5 to 15 parts by weight of at least one pigment additive of the formula (I) and c) 0 to 5 parts by weight of other conventional additives.

8. A pigment preparation as claimed in claim 1, wherein the pigment preparation contains quinacridone additives.

9. A pigment additive of formula (I),:

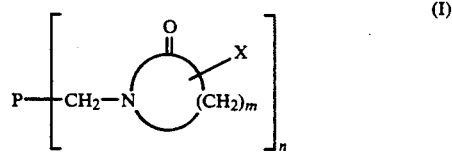

in which P is a radical of an organic pigment from the class consisting of azo pigments, anthraquinone, anthanthrone, flavanthrone, quinacridone, quinophthalone, dioxazine, isoindoline, isoindolinone, perinone, perylene and/or thioindigo pigments, m is an integer from 3 to 20, n can have a value from 0.1 to 4, and X in the methylene groups of the lactam ring is hydrogen, $C_1$–$C_4$-alkyl, phenyl, hydroxyl, $NR^1R^2$, $R^1$ and $R^2$ are independently of one another being hydrogen or $C_1$–$C_4$-alkyl, M being hydrogen or the stoichiometric amount of a mono-, di- or trivalent cation.

10. A method for pigmenting a high-molecular-weight material comprising the step of introducing a pigment preparation of claim 1 into the high-molecular-weight material.

11. A method as claimed in claim 10 wherein the high-molecular-weight material is solvent-borne paint system aqueous borne paint system or a combination thereof.

12. A method as claimed in claim 11, wherein the paint systems are baking paints based on aqueous or solvent-borne paints selected from the class of alkyd melamine resin paints or acrylic melamine resin paints, polyester, polyacrylate, polyurethane, acrylourethane and/or polyester urethane systems.

* * * * *